United States Patent
Li et al.

(10) Patent No.: US 7,895,245 B2
(45) Date of Patent: Feb. 22, 2011

(54) METHODS AND SYSTEMS FOR MANAGING DATA STORED ON A CONTACTLESS FLASH MEMORY DEVICE

(75) Inventors: Jun Li, Mountain View, CA (US); Riddhiman Ghosh, Sunnyvale, CA (US); Thomas Rathbone, Wolverhampton (GB); Mohamed Dekhil, Santa Clara, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 1149 days.

(21) Appl. No.: 11/555,003

(22) Filed: Oct. 31, 2006

(65) Prior Publication Data

US 2008/0104098 A1     May 1, 2008

(51) Int. Cl.
    *G06F 17/30*     (2006.01)
(52) U.S. Cl. ..................................... 707/810
(58) Field of Classification Search ............. 707/651, 707/778, 786, 810, 824, 829
See application file for complete search history.

(56) References Cited

U.S. PATENT DOCUMENTS

| | | | |
|---|---|---|---|
| 5,784,325 A * | 7/1998 | Arase et al. ............ 365/185.18 |
| 7,025,261 B2 | 4/2006 | Lagosanto et al. | |
| 7,155,705 B1 * | 12/2006 | Hershberg et al. .......... 717/137 |
| 2005/0157568 A1 * | 7/2005 | Teicher ....................... 365/195 |
| 2006/0069814 A1 | 3/2006 | Abraham et al. | |

* cited by examiner

*Primary Examiner*—Fred I Ehichioya

(57) ABSTRACT

Methods, systems and machine readable medium storing a machine readable program for managing data stored on a contactless flash memory device are disclosed. A compiled version of a hierarchical data model defined using a high level data structure definition language is provided at a host unit. The host unit is operable to run on a host platform. The compiled version of the hierarchical data model is compiled for the host platform. A first representation of a first hierarchical data structure is received from a contactless flash memory device at the host unit via a contactless communication channel. The first hierarchical data structure is a first instantiation of the hierarchical data model. A second representation of the first hierarchical data structure is generated in accordance with the compiled hierarchical data model at the host unit.

26 Claims, 5 Drawing Sheets

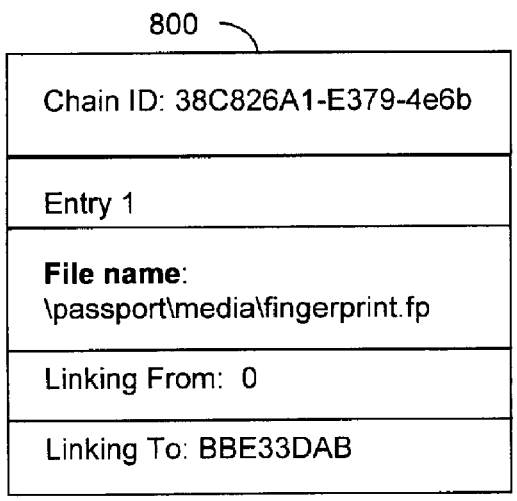
FIG. 8
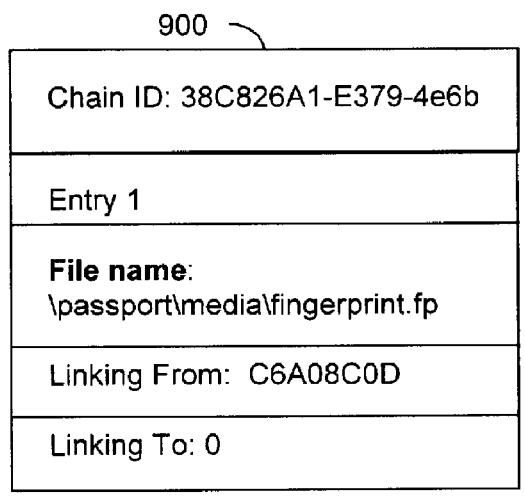
FIG. 9
FIG. 10
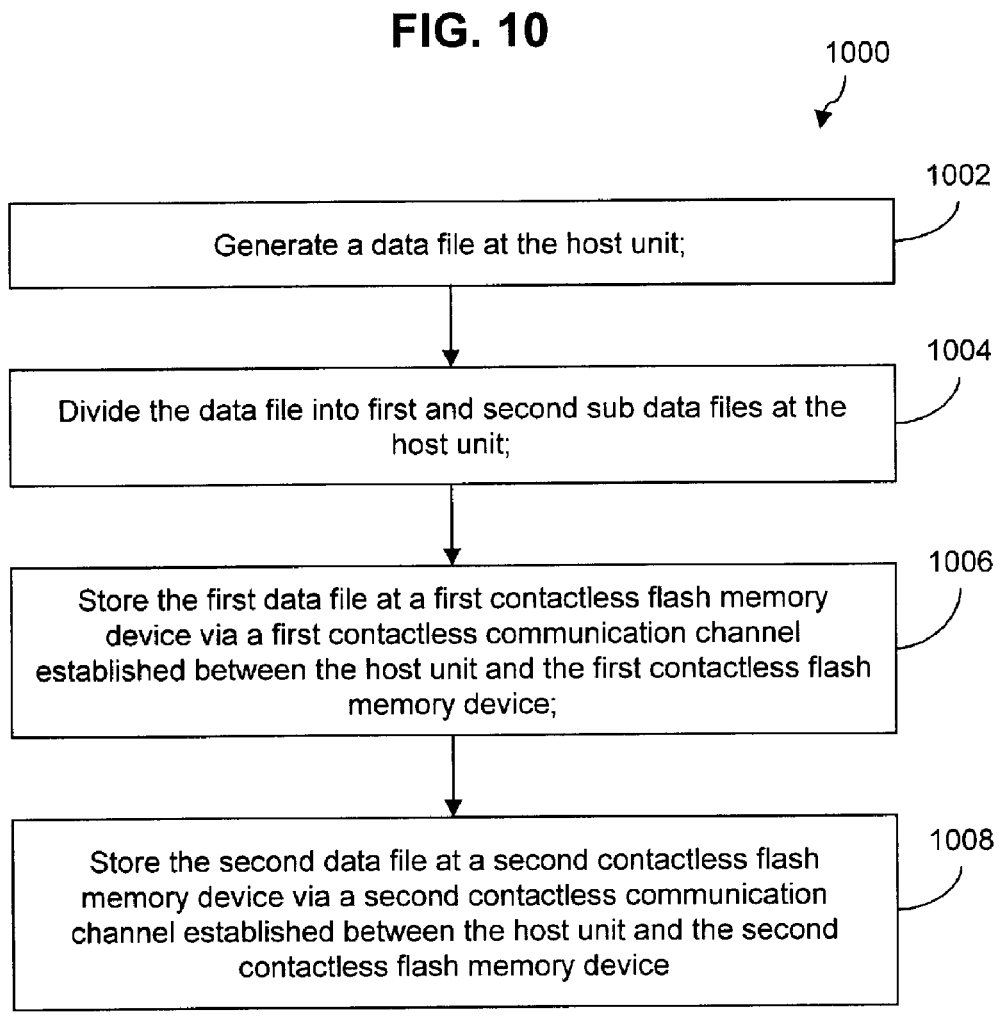

METHODS AND SYSTEMS FOR MANAGING DATA STORED ON A CONTACTLESS FLASH MEMORY DEVICE

FIELD OF THE INVENTION

The present invention generally relates to flash memory devices and more particularly to methods and systems for managing data stored on a contactless flash memory device.

BACKGROUND OF THE INVENTION

Contactless flash memory devices are being used in an increasing number of applications. For example, contactless flash memory devices are often employed in credit card transactions, electronic cash transactions, computer security applications, incentive programs involving the tracking of customer loyalty, and government identification applications.

One prior art contactless memory device is a passive radio frequency identification (RFID) tag. The RFID memory tag is a read only device and includes a memory microchip coupled to an inductive antenna. The RFID memory tag is powered by an RF field that is established between an RFID reader and the RFID memory device. Once the RFID memory tag is powered, the RFID reader retrieves the data stored on the RFID memory tag via a contactless communication channel and passes the retrieved data to a host device, such as for example a computer. The data stored in an RFID memory tag is typically platform dependent. As a result the data stored in an RFID memory tag cannot be accessed by different programs operating on different platforms. Furthermore, two or more RFID memory tags cannot be aggregated to store a single data file.

Another prior art contactless memory device is a contactless smart card. The contactless smart card is a near field communication device that includes a controller, a flash memory microchip, and an inductive antenna. The smart card flash memory microchip offers limited non-volatile and reprogrammable storage. The contactless smart card is also powered by the RF field that is established between a smart card reader/writer and the contactless smart card when the contactless smart card is positioned within range of the smart card reader/writer. The contactless smart card must also be maintained within range of the smart card reader/writer during read and/or write operations. The data stored in a contactless smart card is also typically platform dependent and the data stored in a contactless smart card cannot be accessed by different programs operating on different platforms. Furthermore, two or more contactless smart cards cannot be linked together to store a single data file.

Thus what is needed is a method and system for managing data stored on contactless flash memory device that seeks to overcome one or more of the challenges and/or obstacles described above.

SUMMARY OF THE INVENTION

One aspect of the invention provides a method of managing data stored on a contactless flash memory device. A compiled version of a hierarchical data model defined using a high level data structure definition language is provided at a host unit. The host unit is operable to run on a host platform and the compiled version of the hierarchical data model is compiled for the host platform. A first representation of a first hierarchical data structure from a contactless flash memory device is received at the host unit via a contactless communication channel. The first hierarchical data structure is a first instantiation of the hierarchical data model. A second representation of the first hierarchical data structure is generated in accordance with the compiled hierarchical data model at the host unit.

Another aspect of the invention provides a machine readable medium storing a machine executable program for managing data stored on a contactless flash memory device.

Another aspect of the invention provides a method of managing a data file for storage in multiple contactless flash memory devices. A data file is generated at the host unit. The data file is divided into first and second sub data files at the host unit. The first data file is stored at a first contactless flash memory device via a first contactless communication channel established between the host unit and the first contactless flash memory device. The second data file is stored at a second contactless flash memory device via a second contactless communication channel established between the host unit and the second contactless flash memory device.

Another aspect of the invention provides a machine readable medium storing a machine executable program for managing a data file for storage in multiple contactless flash memory devices.

BRIEF DESCRIPTION OF THE DRAWINGS

The present invention is illustrated by way of example and not limited in scope to the accompanying figures, in which like reference numerals indicate similar elements, and in which:

FIG. 8 is an illustration of an example of one embodiment of a linking table linking a first flash memory device to a second flash memory device in accordance with the principles of the present invention;

FIG. 9 is an illustration of an example of one embodiment of a linking table linking a second flash memory device to a first flash memory device in accordance with the principles of the present invention; and FIG. 10 is a flowchart of one embodiment of a method managing a data file for storage in multiple contactless flash memory devices in accordance with the principles of the present invention.

DETAILED DESCRIPTION OF THE PREFERRED EMBODIMENTS

Figure 1:
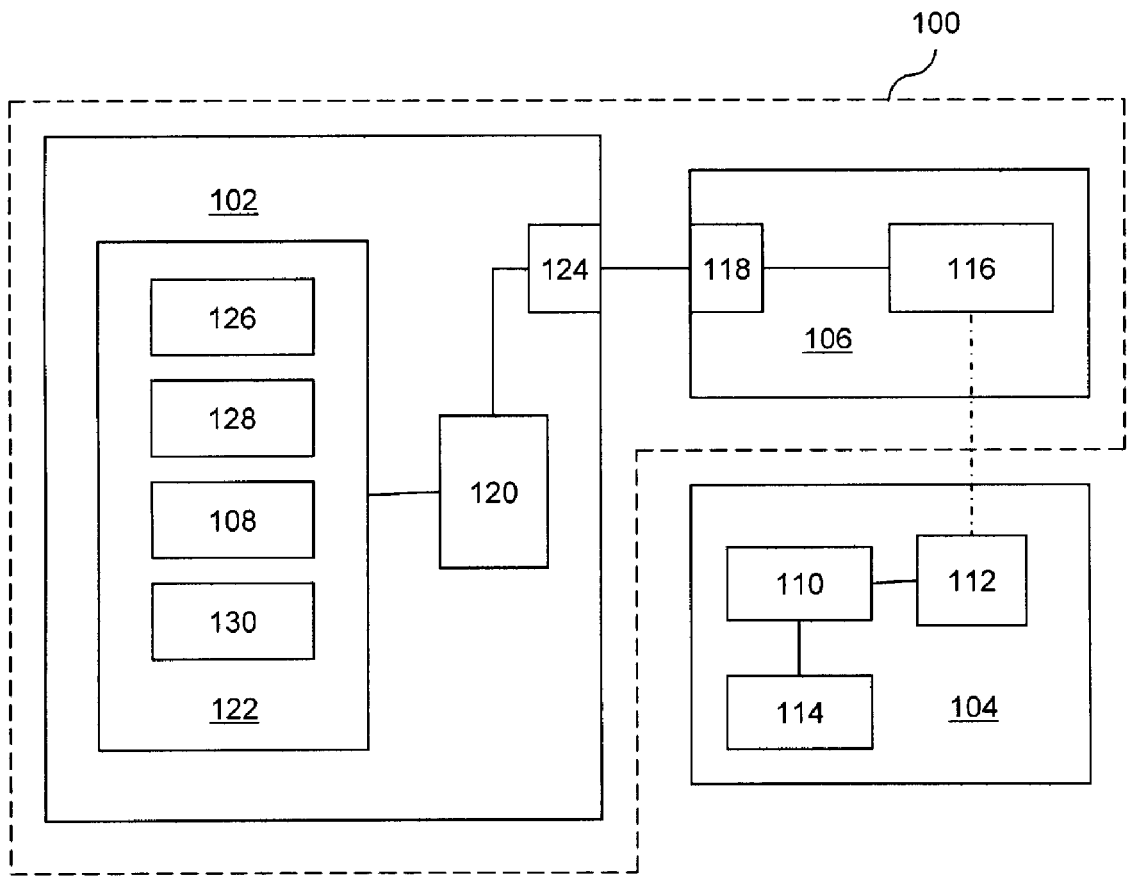
FIG. 1 is a schematic block diagram of one embodiment of a flash memory device communicatively coupled to a host unit in accordance with the principles of the present invention.

Referring to FIG. 1, a schematic block diagram of one embodiment of a flash memory device 104 communicatively coupled to a host unit 100 in accordance with the principles of the present invention is shown. The host unit 100 generally includes a host device 102 communicatively coupled to a host accessory device 106. A flash memory application framework module 108 is installed on the host device 102. The flash memory device 104 generally includes a flash memory controller 110 communicatively coupled to an inductive antenna system 112, and a flash memory 114. The flash memory controller 110 implements data read, write and/or erase commands received via the inductive antenna system 112 on the data stored in the flash memory 114. The flash memory controller 110 also retrieves data from and stores data onto the flash memory 114 in accordance with read and/or write commands received via the inductive antenna system 112. While one type of a flash memory device 104 has been described, the use of alternative types of contactless flash memory devices are also considered to be within the scope of the invention.

The host accessory device 106 generally includes a reader/writer 116 and a host accessory data port 118. The host accessory device 106 operates as an interface between the host device 102 and the flash memory device 104. The flash memory application framework module 108 is a software application module that is loaded onto the host device 102 and generally manages the manipulation of data transmitted to and received from the flash memory device 104 at the host device 102. The flash memory application framework module 108 also generates specific read, write and/or erase commands for issuance to the flash memory device 104 via the host accessory device 106.

The host device 102 generally includes a host controller 120, a host memory 122 and a host data port 124. The host device 102 may also include other components that facilitate the use and operation of the host device 102, such as for example, a display screen and input/output devices. Examples of host devices 102 include, but are not limited, to personal computers and handheld computer devices. The host memory 122 generally includes an operating system module 126, one or more host application modules 128, a flash memory application framework module 108, and a cache memory 130. The operating system module 126, among other things, provides library and driver support for the host controller 120 and the host data port 124. The flash memory application framework module 108 interfaces with the host application module 128 and provides general runtime support, including but not limited to, communication management, application management, and data management. The cache memory 130 is used to store a copy of data downloaded from one or more flash memory devices 104.

In one embodiment, the host device 102 interacts with one or more flash memory devices 104. In one embodiment, the host application module 128 interacts with one or flash memory devices 104. In one embodiment, a flash memory application generally includes one or more host application modules 128, where each of the host application modules 128 interact with one or more flash memory devices 104.

In one embodiment, the flash memory device 104 interacts with a single host application module 128. In one embodiment, a flash memory device 104 stores data associated with two or more flash memory applications and interacts with host application modules 128 associated with each of the two or more flash memory applications. In one embodiment, the flash memory device 104 interacts with different host application modules 128 running on different host devices 102, where each host application module 128 is supported by a different host platform. In one embodiment, the flash memory device 104 interacts with different versions of a host application module 128 where each of the different versions of the host application module 128 is supported by different host platforms.

The host device 102 generates specific commands to retrieve data stored on the flash memory device 104 and/or manipulate the storage of data on the flash memory device 104, responsive to commands received from a host application module 128. More specifically, the flash memory application framework module 108, running on the host device 102, communicates with the host application module 128 and responsively generates the specific data read, write and/or erase operations to be performed on the data stored on the flash memory 114 in the flash memory device 104. In one embodiment, the flash memory application framework module 108 controls access to the data stored on the flash memory device 104, such that only the host application modules 128 that function on behalf of authorized users or user groups are allowed access to the flash memory device data. In one embodiment, the flash memory application framework module 108 controls the level of access to the data stored on the flash memory device 104, such that all of the host application modules 128 associated with a flash memory application are allowed access to the flash memory device data, however only the host application modules 128 that function on behalf of authorized users or user groups are allowed to modify the data stored on the flash memory device 104.

The host accessory device 106 operates as the interface between the host device 102 and the flash memory device 104 and transmits the read, write, and/or erase commands issued by the host device 102 to the flash memory device 104. The flash memory controller 110 receives and implements the read, write and/or erase commands issued by the host device 102.

In one embodiment, the host device 102 translates the file level read, write and/or erase commands into low level read, write and/or erase commands that are recognizable by the flash memory device 104. The translated low-level read, write and/or erase commands are transmitted to the reader/writer 116. The reader/writer 116 transmits the received low-level read, write and/or erase commands to the flash memory device 104. In another embodiment, the host device 102 forwards the file level read, write and/or erase commands to the reader/writer 116 and the reader/writer 116 translates the received file level read, write and/or erase commands into low-level read, write and/or erase commands that are recognizable by the flash memory device 104. The translated low-level read, write and/or erase commands are transmitted from the reader/writer 116 to the flash memory device 104 for implementation.

A communicative coupling between the host device 102 and the host accessory device 106 is established via the host data port 124 and the host accessory data port 118. In one embodiment, the host device 102 is communicatively coupled to the host accessory device 106 via a wired communication system. Wired communication can be achieved, for example, via a serial data connection, a parallel data connection, or a USB connection. In another embodiment, the host device 102 is communicatively coupled to the host accessory device via a wireless communication system, such as for example, via a Bluetooth communication system. In another embodiment, the host accessory device 106 is integrated with the host device 102 as a component of the host device 102.

When the host accessory device 106 receives a command signal from the host device 102 to retrieve data from the flash memory device 104 or to update data stored on the flash memory device 104, the host accessory device 106 responsively establishes a radio frequency (RF) field between the host accessory device 106 and the flash memory device 104. More specifically, the reader/writer 116 generates an RF field between the reader/writer 116 and the inductive antenna system 112. The generated RF field creates a RF power coupling between the reader/writer 116 and the inductive antenna system 112 thereby powering the electronic components of the flash memory device 104. The generated RF field also creates a contactless communication channel between the reader/writer 116 and the flash memory device 104.

In one embodiment, the contactless communication channel between the reader/writer 116 and the flash memory device 104 is established only during those periods when active read, write and/or erase operations are being performed on the data stored in the flash memory device 104. In other words, the contactless communication channel between the reader/writer 116 and the flash memory device 104 is terminated once the transfer of data between the host device 102 and the flash memory device 104 is complete. In one embodiment, the flash memory device 104 is powered by the reader/writer 116 only during those periods when active read, write and/or erase operations are being performed on the data stored in the flash memory device 104. In one embodiment, the RF field between the reader/writer 116 and the flash memory device 104 is established only during those periods when active read, write and/or erase operations are being performed on the data stored in the flash memory device 104. It should be noted that while mechanisms for creating a contactless communication channel between a reader/write 116 and a flash memory device 104 have been described, alternative mechanisms for creating a contactless communication channel between a reader/writer and a flash memory device are also considered to be within the scope of the invention.

In one embodiment, the flash memory device 104 is positioned approximately 1 mm to approximately 2 mm away from the host accessory device 106 in order to be within range for the reader/writer 116 to be able to establish the RF field between the reader/writer 116 and the flash memory device 104. In one embodiment, the carrier frequency for exchanging data between the reader/writer 116 and the flash memory device 104 is approximately 2.45 GHz. Flash memory device 104 that can be positioned at distances less than or greater than that described above and/or the use of carrier frequencies greater than or less than 2.45 GHz are also considered to be within the scope of the invention.

As shown in FIG. 1, one embodiment of the host unit 100 generally includes the host device 102 communicatively coupled to the host accessory device 106. The flash memory application framework module 108 is installed on the host device 102. The flash memory application framework module specific functions are performed at the host device 102 by the host controller 120. The flash memory application framework module 108 interfaces with the host application module 128 residing on the host device 102 and interacts with one or more flash memory devices 104 dedicated to storing the data generated by that host application module 128 via the host accessory device 106.

In another embodiment, the host unit includes a host device with an integrated host accessory device. The flash memory application framework module 108 is installed on the integrated host device/host accessory device. The flash memory application framework module specific functions are performed at the integrated host device/host accessory device by the integrated host device/host accessory device controller. The flash memory application framework module 108 interfaces with the host application module 128 residing on the integrated host device/host accessory device and interacts with one or more flash memory devices 104 dedicated to storing the data generated by that host application module 128.

In another embodiment, the host unit consists of a host accessory device, where the host accessory device includes a host accessory device controller and a host accessory device memory. The flash memory application framework application module 108 is installed on the host accessory device. The flash memory application framework module specific functions are performed at the host accessory device by the host accessory device controller. The flash memory application framework module 108 interfaces with the host application module 128 residing on the host device and interacts with one or more flash memory devices 104 dedicated to storing the data generated by that host application module 128.

In another embodiment, the host unit consists of a host device and a host accessory device, where the host accessory device includes a host accessory device controller and a host accessory device memory. Some of the flash memory application framework module specific functions may be performed at the host device by the host controller while other flash memory application framework module specific functions may be performed at the host accessory device by the host accessory device controller. The flash memory application framework module 108 interfaces with the host application module 128 residing on the host device and interacts with one or more flash memory devices 104 dedicated to storing the data generated by that host application module 128.

Figure 2:
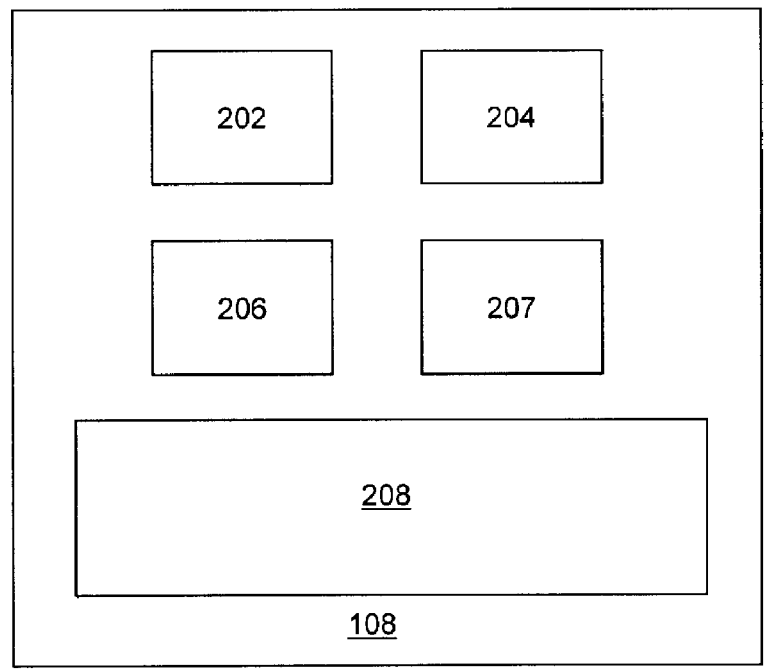
FIG. 2 is a block diagram representation of one embodiment of a flash memory application framework module in accordance with the principles of the present invention.

Referring to FIG. 2, a block diagram representation of one embodiment of a flash memory application framework module 108 in accordance with the principles of the present invention is shown. The flash memory application framework module 108 is stored on a host device 102 and interacts with one or more host applications stored on the host device 102. A flash memory application framework module 108 interfaces with one host application module 128 at a time. The flash memory application framework 108 interacts with one or more flash memory devices 104 storing the data associated with the host application. The flash memory application framework 108 can support one or more different types of host application modules 128, where the different types of host application modules 128 are associated with a single flash memory application.

The flash memory application framework module 108 generally includes a communication module 202, a runtime management module 204, an application management module 206, a flash memory interaction module 207, and a data management module 208. The communication module 202 monitors the status of the one or more flash memory devices 104 associated with the host application module 128 based on information received from the host accessory device 106. Examples of the types of status events monitored include, but are not limited to, whether the flash memory device 104 is within range or out of range of the host accessory device 106, whether a contactless communication channel between the host accessory device 106 and the flash memory device 104 is available or unavailable, and whether a read, erase, and/or write operation to the flash memory device 104 is in progress. The communication module 202 also packages the data at the host device 102 for transmission to the flash memory device 104 and synchronizes the transmission of data from the host device 102 to the flash memory device 104.

The runtime management module 204 manages the operation of the flash memory application framework module 108 including the starting up and shutting down of the flash memory application framework module 108. The runtime management module 204 also manages the resources, such as for example, threads and communication channels associated with the flash memory application framework module 108.

The application management module 206 retrieves flash memory specific data to determine whether a flash memory device 104 stores data associated with a particular host application module 128. Examples of flash memory specific data include, but are not limited to, flash memory device header data, registration data, activation data, and host application compatibility data. If there are multiple host application modules 128 installed in a host device 102, the application management module 206 evaluates the flash memory specific data retrieved from a flash memory device 104 to determine whether one or more host application modules 128 residing on the host device 102 is associated with that flash memory device 104.

The flash memory interaction module 207 generally tracks historical data associated with interactions between the host application module 128 and one or more flash memory devices 104. The flash memory interaction module 207 uses the historical data to determine, the most recent flash memory device 104 that has been cached to the host device 102, the availability of space in the cache memory 130 for caching a flash memory device 104, and whether the data previously cached from a flash memory device 104 can be deleted.

The data management module 208 manipulates the data received from and transmitted to the flash memory device 104 and handles requests received from the host application module 128. In one embodiment, the data management module 208 coordinates the retrieval and/or storage of data to and from a flash memory device 104 where the data is associated with one or more host application modules 128. In one embodiment, the data management module 208 coordinates the retrieval and/or storage of data to and from a flash memory device 104 where the data is associated with one or more flash memory applications. In one embodiment, the data management module 208 coordinates the retrieval and/or storage of data to and from one or more linked flash memory devices 104 where the linked flash memory devices 104 are aggregated to operate as a single integrated memory storage device. In one embodiment, the data management module 208 controls host application module 128 and/or user access to the data values retrieved from one or more flash memory devices 104 based on predefined control access attributes associated with the data field associated with the retrieved data values. In one embodiment, the data management module 208 manipulates the representation format of the data retrieved from a flash memory device 104 in accordance with a pre-defined data model so that the retrieved data can be used by a host application module 128. In one embodiment, the data management module 208 manipulates the representation format of the data generated and/or updated by a host application module 128 so that the data can be stored in the flash memory device 104. In one embodiment, the data management module 208 generates digital signatures of selected one or more data fields and/or one or more data files in accordance with pre-defined digital signature parameters to ensure the integrity of the selected data fields and/or files.

When a host application module 128 is initiated, the reader/writer 116 establishes an RF field with the flash memory device 104 associated with the initiated host application module 128 thereby powering the flash memory device 104 and establishing a contactless communication channel between the reader/writer 116 and the flash memory device 104. The data stored on the flash memory device 104 is downloaded to the host device 102 via the host accessory device 106 and stored in the cache memory 130.

In one embodiment, the entire data content of the flash memory device 104 is downloaded from the flash memory device 104 and stored in the cache memory 130. In another embodiment, selected data files are downloaded from the flash memory device 104 and stored in the cache memory 130. Each of the downloaded data files that are stored in the cache memory 130 are designated as the original versions of the data files. In one embodiment, data files associated with different data types are downloaded from the flash memory device 104 in accordance with a specified data type retrieval order and stored in the cache memory 130. In another embodiment, data files associated with one or more specific data types are downloaded and stored in the cache memory while other specific data types are only downloaded from the flash memory device 104 responsive to a request from the host application module 128.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

Figure 3:
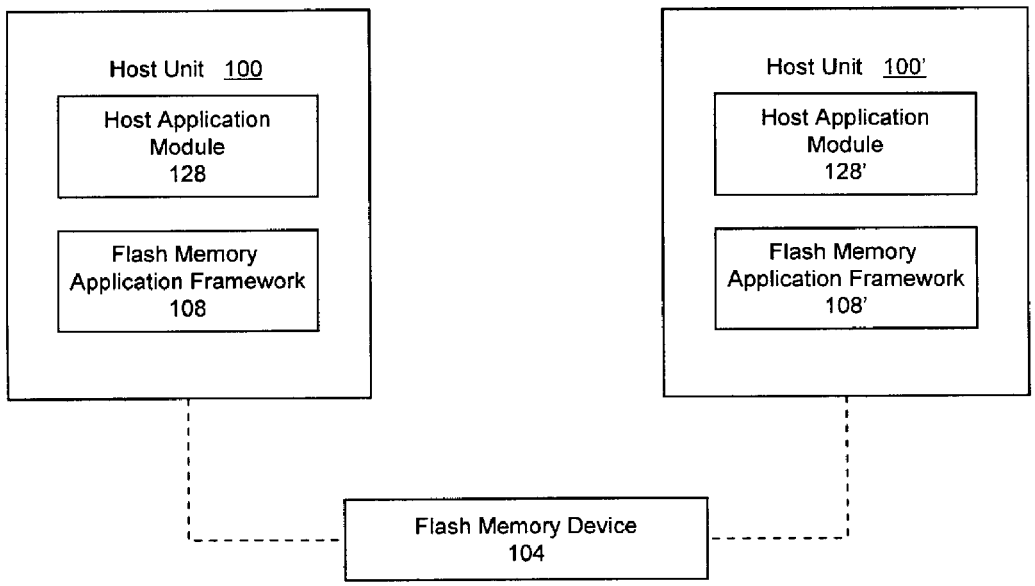
FIG. 3 is a block diagram illustration of one embodiment of a relationship between a flash memory device and two different host units running on two different host platforms in accordance with the principles of the present invention.

Referring to FIG. 3, a block diagram illustration of one embodiment of a relationship between a flash memory device 104 and two different host units 100, 100' running on two different host platforms in accordance with the principles of the present invention is shown. A first host application module 128 and a flash memory application framework 108 are stored in a first the host unit 100 and operate on a first host platform. A second host application module 128' and a flash memory application framework 108' are stored in a second the host unit 100' and operate on a second host platform. The first and second host platforms are two different host platforms. The first and second host application modules 128, 128' and the flash memory device 104 are associated with a specific flash memory application. In other words, the flash memory device 104 stores data associated with the specific flash memory application and the first and second host application modules 128 access the data stored on the flash memory device 104 as a part of performing one of more host application module related functions.

While a single flash memory device 104 is shown in FIG. 3, multiple flash memory devices 104 storing flash memory application related data may interact with the host application modules 128, 128'. In addition, multiple host application modules 128, 128' associated with a single flash memory application and residing on multiple different host units 100, 100' operating on multiple different host platforms can access the flash memory application data stored on the flash memory device 104.

When a host application module 128, 128' requires access to the flash memory application data stored on a particular flash memory device 104, associated host unit 100, 100' establishes a contactless communication channel with the flash memory device and downloads data from the flash memory device 104 to a cache memory 130. In one embodiment, the contents of the flash memory device 104 are fully cached in the cache memory 130. In another embodiment, the contents of the flash memory device 104 are partially cached in the cache memory 130. The flash memory application framework 108, 108' and more specifically the data management module 208 manages data related operations between the host application module 128, 128' and cached data retrieved from the flash memory device 104.

The data stored in the flash memory device 104 is host platform independent. The flash memory application framework 108, 108' manages the translation of data retrieved from a flash memory device 104 into a host platform implementation language that is recognizable to a host application 128, 128' operating on that host platform. This allows host application modules 128, 128' that are supported by different host platforms to interact with data retrieved from a flash memory device 104.

In order to facilitate the use of data stored in the flash memory device 104 across multiple host platforms, a high level data structure definition language is used to create data models for flash memory application specific data stored on a flash memory device 104. In one embodiment, the data models are hierarchical data models. Examples of high level data structure definition languages that may be used to define the data models include, but are not limited to, Interface Definition Language (IDL) and XML. The flash application specific data model is provided to each flash memory application framework module 108, 108' that interacts with the one or more host application modules 128, 128' associated with the specific flash memory application.

In one embodiment, the data model is compiled at host unit 100, 100' from the high level data structure definition language for the associated host platform. In other words, the data model is compiled into a host platform implementation language associated with the host platform. For example, in FIG. 3, the data model is compiled from the high level data structure definition language for the first host platform at the first host unit 100 and for the second host platform at the second host unit 100'. In another embodiment, the data model is compiled on a different machine for a specific host platform. The compiled version of the data model is provided to a host unit 100 that operates on that specific host platform.

In one embodiment, during the compilation of the data model from the high level data structure definition language to the host platform, one or more platform specific helper classes are generated in accordance with the defined data model. The generated platform specific helper classes are flash memory application specific, dynamically pluggable components of the flash memory application framework 108 and operate as an interface and facilitate data related operations between the host application module 128 and the flash memory application data retrieved from a flash memory device 104. The platform specific helper classes are components of the platform specific compiled version of the associated data model. When a compiled version of a data model is provided to a host unit 100, the platform specific helper classes are components of the compiled version of the data model.

In one embodiment, a hierarchical data structure generated by a host application module 128 in connection with a flash memory application has a hierarchical data format. In one embodiment, two of the platform specific helper classes that are generated during the compilation of the hierarchical data model are a platform specific data marshaller and a platform specific data demarshaller. The flash memory application framework 108 at the host unit 100 is provided with the hierarchical data model associated with the flash memory application data stored in the flash memory device 104. In one embodiment, a compiled version of the hierarchical data model is provided to the host unit 100. In another embodiment, the high level data structure definition language version of the hierarchical data model is provided to the host unit 100 and the hierarchical data model is compiled from the high level data structure definition language for the first host platform at the host unit 100. The platform specific data marshaller and platform specific data demarshaller are generated during the compilation of the hierarchical data model from the high level data structure definition language to the host platform specific implementation language.

When a hierarchical data structure associated with the provided hierarchical data model, in other words, the hierarchical data structure is an instantiation of the hierarchical data model, is generated by the host application module 128, the generated hierarchical data structure is forwarded to the flash memory application framework 108 for storage in the flash memory device 104. The platform specific data marshaller serializes the hierarchical data structure from the hierarchical data format into a representative binary data byte sequence for storage on the flash memory device 104.

When a hierarchical data structure is retrieved from a flash memory device for use by a host application module 128, the retrieved hierarchical data structure has a binary data byte sequence format. The platform specific data demarshaller deserializes the binary data byte sequence representation of the hierarchical data structure into a host platform specific hierarchical data format for use by the host application module 128.

When a host application module 128 modifies a hierarchical data structure retrieved from a flash memory device 104, the modification is reflected in the hierarchical data format representation of the hierarchical data structure. The modified hierarchical data structure is forwarded to the flash memory application framework module 108 and the platform specific data marshaller serializes the modified hierarchical data structure from the hierarchical data format generated by the host application module 128 into a representative binary data byte sequence for storage in the flash memory device 104.

In one embodiment, during the definition of the data model using the high level data structure definition language, an access control attribute can be defined with respect to one or more data fields within the data model. In one embodiment, the access control attribute defines the authorized users or user groups that are permitted access to values of such data fields. In one embodiment, the access control attribute defines the level of access provided to different levels of authorized users or user groups with respect to such data fields. In one embodiment, the access control attribute defines a data field as a non-modifiable or read only data field. In one embodiment, the access control attribute defines the authorized users or user groups that are allowed to modify the values of the data field. When the data model is compiled from the high level data structure definition language for a specific host platform, a platform specific access control enforcer is generated in accordance with the defined access control attribute as a platform specific helper class in the flash memory application framework module 108. The platform specific access control enforcer controls host application module 128 access to the values of the associated data fields in accordance with the defined control access attribute.

In one embodiment, during the definition of the data model using the high level data structure definition language, a first data field can be designated to store the digital signature of a second data field. Storing the digital signature of a second data field in a first data field provides a mechanism for checking the integrity of a value of the second data field. The flash memory application framework module 108 generates the digital signature of a value of the second data field and stores the generated signature in the first data field. In one embodiment, the flash memory application framework module 108 does a data integrity check by verifying the digital signature associated with a value of the second data field retrieved from a flash memory device 104 against the value of the second data field retrieved from the flash memory device 104. In one embodiment, the data integrity check is performed by the host application module 128. In one embodiment, the flash memory application framework module 108 performs the data integrity check responsive to a request from a host application module 128.

In one embodiment, during the definition of the data model using the high level data structure definition language a digital signature attribute can be defined with respect to one or more selected data fields. When the data model is compiled from the high level data structure definition language for a specific host platform, a platform specific digital signature generator is generated in accordance with the defined digital signature attribute as a platform specific helper class in the flash memory application framework module 108. The digital signature generator creates digital signatures for the values of the data fields specified in the data model and creates digital signature storage fields within the data structure to store the created digital signature.

In one embodiment, during the definition of the data model using the high level data structure definition language different data fields in the data model can be designated as specific data types. For example, a data field may be designated as a data data type or as a media data type. In one embodiment, the data content of a flash memory device 104 is partially cached into the cache memory 130 at the host unit 100. In one embodiment, the flash memory framework application module 108 issues commands to cache data files stored on a flash memory device 104 based on data type in accordance with a pre-defined data type retrieval order. In one embodiment, the data files are stored in a data directory and the media files are stored in a media directory on the flash memory device 104. In one embodiment, the flash memory application framework module 108 caches the data directory in the cache memory 130. The flash memory application framework module 108 provides the host application module 128 with access to the data files in the data directory while the flash memory application framework modules 108 downloads the media directory into the cache memory 130. In another embodiment, the flash memory application framework module 108 caches the data directory into the cache memory and provides the host application module 128 with access to the data files in the data directory. The flash memory application framework module 108 only issues a command to download the media directory responsive to a request received from the host application module 128.

Figure 4:
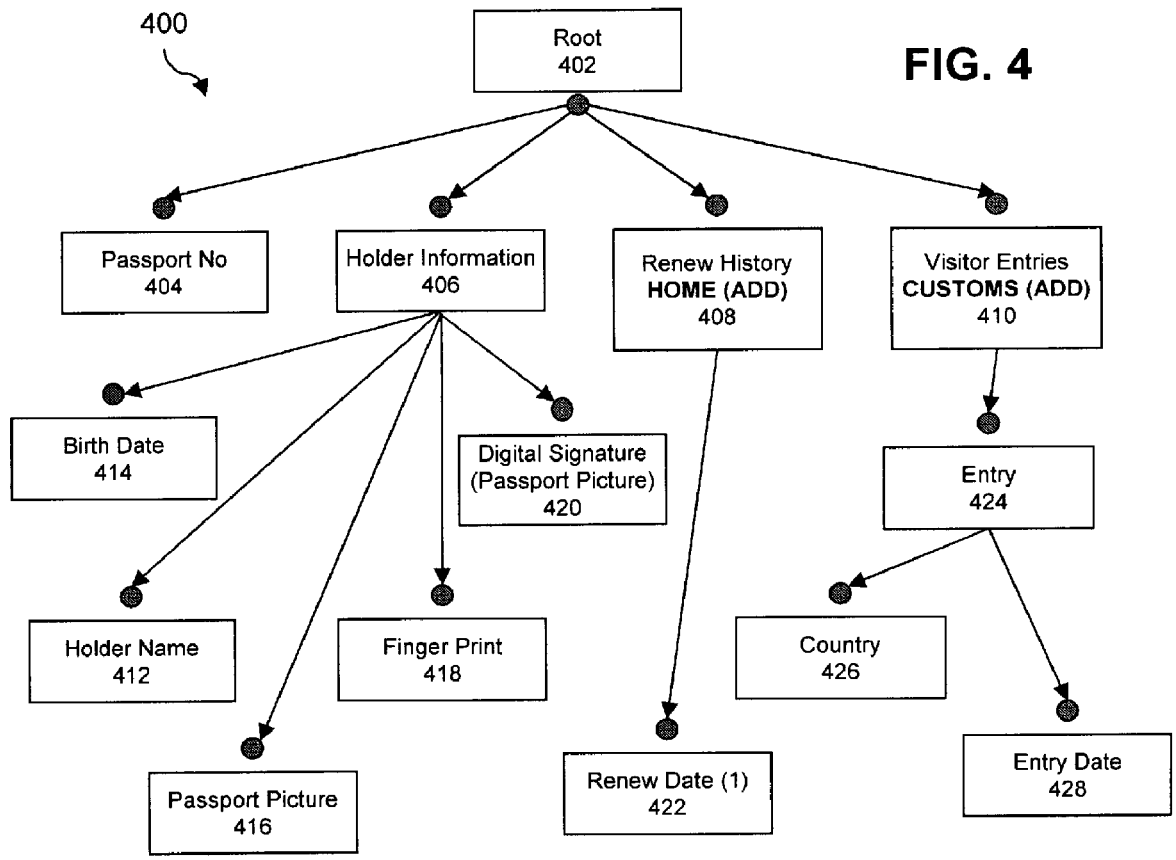
FIG. 4 is an illustration of an example a hierarchical data structure that may be stored on one embodiment of a flash memory device in accordance with the principles of the present invention.

Referring to FIG. 4, an illustration of an example a passport hierarchical data structure 400 that may be stored on one embodiment of a passport flash memory device 104 in accordance with the principles of the present invention is shown. In this example, a passport flash memory application is associated with a home passport host application module and a customs passport host application module. The home passport host application module is used for passport issuance and/or renewal in the passport holder's country and the customs passport host application module is used to update data associated with countries visited at a customs entry point. The host passport host application module and the customs passport application module operate on two different host platforms. A passport flash memory device 104 is associated with each passport and is used to store data typically found in the passport.

A hierarchical data model for storing passport data is defined using a high level data structure definition language. The illustrated passport hierarchical data structure is an example of a hierarchical data structure that has been generated in accordance with the defined hierarchical data model. In other words the illustrated passport hierarchical data structure is an instantiation of the defined passport hierarchical data model. The passport hierarchical data model includes a data field for a passport number. A passport holder information data branch includes data fields for the passport holder name, birth date, passport picture, fingerprint, and a digital signature field for the passport picture. A passport renewal history data branch includes a data field for passport renewal dates. A visitor entries data branch includes a data branch for entry into a country. The entry data branch includes data fields for country entered and the date of entry.

The data fields in the hierarchical data model have been defined to permit read access to all of the data fields in the data model by all host application modules associated with the passport flash memory application.

A first control access attribute has been defined for the data fields in the passport renewal history branch such that only a home passport host application module that presents the correct credentials to the flash memory application framework 108 on behalf of a user, is authorized to add data values to data fields with the passport renewal history branch. A second control access attribute has been defined for the visitor entries branch such that only a customs passport host application module that presents the correct credentials to the flash memory application framework 108 on behalf of a user, is authorized to add visitor entry data to the data fields in the visitor entry branch.

The illustrated passport hierachical data structure is an example of how passport data would be organized in accordance with the defined hierarchical data model. The root 402 includes a first branch storing the holder passport number 404, a second branch storing the passport holder information 406, a third branch storing the passport renewal history 408, and a fourth branch storing visitor entries 410. The passport holder information branch 406 includes the passport holder name 412, the birth date 414, the passport picture 416, the fingerprint 418, and a digital signature of the passport picture 420. The renewal history branch 408 includes the renewal date of the passport 422. The visitor entries branch 410 includes a first entry 424. The first entry 424 includes the country entered 426 and the date of entry 428. The data files are stored in a data directory in the passport flash memory device and the media files, such as for example, the passport picture and the fingerprint impression are stored in a media directory in the passport flash memory device.

An interaction between a passport flash memory device storing the illustrated passport hierarchical data structure and a home passport host application module is described below. When the hierarchical data model for the passport data is compiled for the host platform supporting the home passport host application module, a platform specific data marshaller, a platform specific data demarshaller, and a platform specific access control enforcer are generated in accordance with the defined hierarchical data model.

The home passport application module operates on a host unit. When the holder of a passport provides the host unit 100 with access to the passport flash memory device, the flash memory application framework module 108 issues commands to download the data file directory from the passport flash memory device to the cache memory 130 via a contactless communication channel. The passport hierarchical data structure downloaded from the flash memory device is in a binary data byte sequence format. The platform specific data demarshaller deserializes the binary data byte sequence format of the passport hierarchical data structure into a hierarchical format for use by the home passport application module. Upon presentation of the correct credentials to the flash memory application framework 108, the home passport host application module is authorized to read all of the data elements retrieved from the passport flash memory device and to add renewal dates 422 in the renewal history branch 408. The access control enforcer enforces the home passport host application module access rights to the passport data.

The flash memory application framework only issues a command to download the media directory from the passport flash memory device into the cache memory responsive to a request from the home passport host application module to download a specific media file. If the host passport host application updates a renewal data field, the updated passport hierarchical data structure is forwarded to the flash memory application framework in a hierarchical format for storage on the passport flash memory device. The platform specific data marshaller serializes the hierarchical format into a representative binary data byte sequence for storage on the passport flash memory device.

Figure 5:
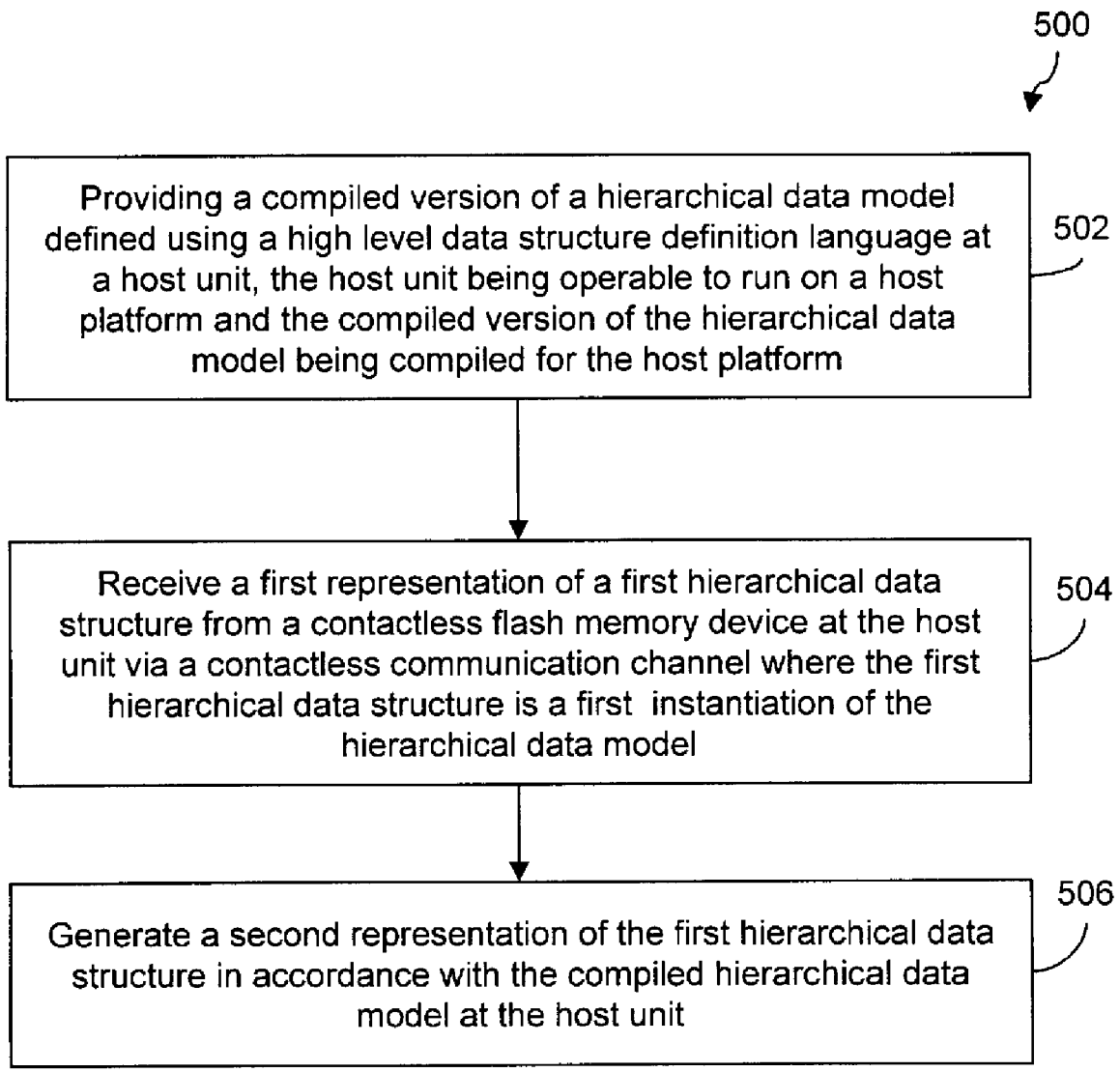
FIG. 5 is a flowchart of one embodiment of a method of managing data stored on a flash memory device in accordance with the principles of the present invention.

Referring to FIG. 5, one embodiment of a method 500 of managing data stored on a contactless flash memory device in accordance with the principles of the present invention is shown. A compiled version of a hierarchical data model defined using a high level data structure definition language is provided at a host unit. The host unit is operable to run on a host platform and the compiled version of the hierarchical data model is compiled for the host platform at step 502. A first representation of a first hierarchical data structure is received from a contactless flash memory device at the host unit via a contactless communication channel at step 504. The first hierarchical data structure is a first instantiation of the hierarchical data model. A second representation of the first hierarchical data structure is generated in accordance with the compiled hierarchical data model at the host unit at step 506. It should be noted that while the steps in the method 500 have been described in a particular order, performing one or more of the steps in a different order are also considered to be within the scope of the invention.

In another embodiment, a machine readable medium stores a machine executable program for managing data stored on a contactless flash memory device. The machine readable medium includes machine readable code for providing a compiled version of a hierarchical data model defined using a high level data structure definition language at a host unit, the host unit being operable to run on a host platform and the compiled version of the hierarchical data model being compiled for the host platform, machine readable code for receiving a first representation of a hierarchical data structure from a contactless flash memory device at the host unit via a contactless communication channel, the hierarchical data structure being a first instantiation of the hierarchical data model, and machine readable code for generating a second representation of the hierarchical data structure in accordance with the compiled hierarchical data model at the host unit.

In one embodiment, a flash memory device 104 can be used to store data generated by two or more different host application modules 128 where each of the host application modules 128 are associated with a different flash memory application. For example, data generated by a first host application module associated with a first flash memory application is stored in a first flash memory application specific directory and data generated by a second host application module associated with a second flash memory application is stored in a second flash memory application specific directory. Both the first and second flash memory application specific directories are stored on a single flash memory device 104. If for example, the first host application module associated with the first flash memory application needs to access the data stored in the first flash memory application specific directory on the flash memory device 104, the flash memory application framework 108 issues commands to download only the first flash memory application specific directory from the flash memory device 104 to the cache memory 130.

In one embodiment, two or more flash memory devices 104 can be linked together to create a chain of aggregated flash memory device. This enables the storage of large files that may exceed the storage capacity of a single flash memory device 104 in two or more linked flash memory devices 104. The chain of linked flash memory devices 104 is identified by a globally unique chain identifier. Each individual flash memory device 104 is assigned a globally unique flash memory identifier. A linking table is stored in the each of the linked flash memory devices 104. In one embodiment, the linking table for a specific flash memory device 104 in the chain of linked flash memory devices includes the chain identifier, the name of the divided file stored in the flash memory device, and the flash memory device identifier for the previous flash memory device 104 in the chain and the next flash memory device 104 in the chain. It should be noted that while one embodiment of a linking table has been described, alternative forms of linking table defining the link between flash memory devices 104 linked together in a chain are also considered to be within the scope of the invention. In one embodiment, the flash memory application framework module 108 partitions the data files, coordinates the storage of the partitioned data files, coordinates the linking of the flash memory devices 104, and then creates the linking tables for storage in the flash memory devices 104. The flash memory application framework application module 108 coordinates the caching of each of the linked flash memory devices 104 into the cache memory. The flash memory application framework module 108 uses the linking tables stored in the chain of flash memory devices 104 to reconstruct the data stored across the multiple flash memory devices 104.

Figure 6:
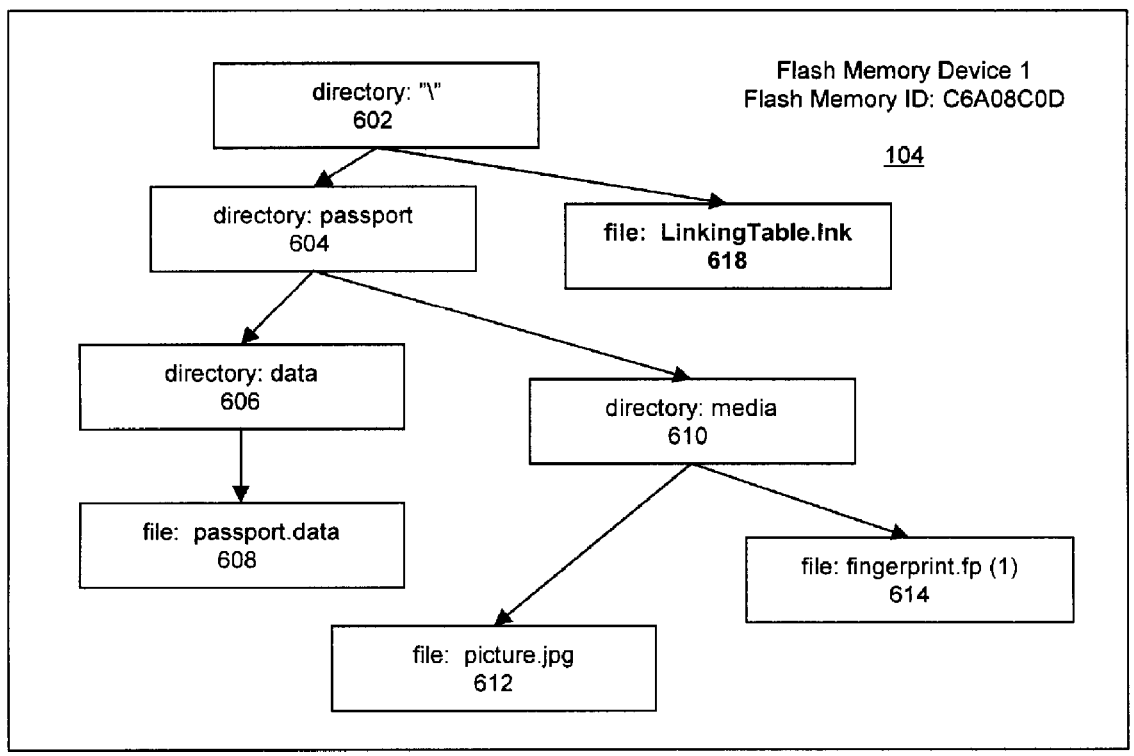
FIG. 6-FIG. 7 is an illustration of an example of one embodiment of two flash memory devices being linked together to store a data file in accordance with the principles of the present invention.
Figure 7:
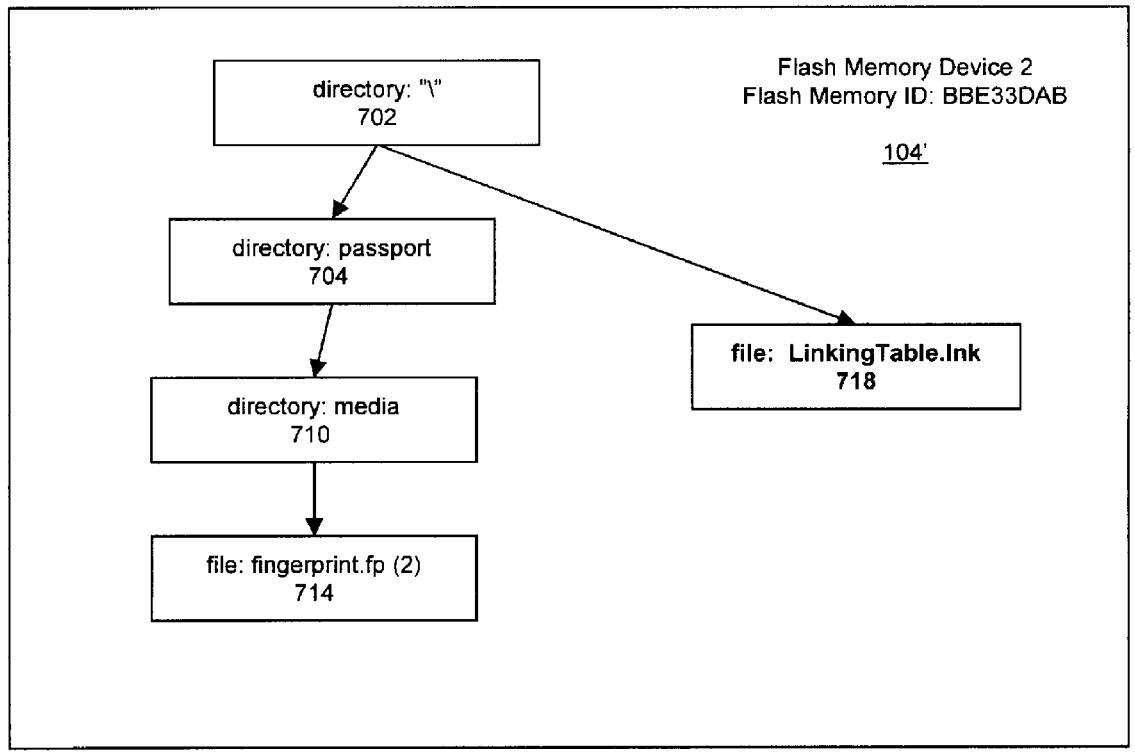

FIGS. 6 and 7 illustrate an example of two flash memory devices 104, 104' that have been linked together to store data associated with a single passport holder in accordance with the principles of the present invention. The first flash memory device 104 has a flash memory device identifier C6A08C0D and the second flash memory device 104' has a flash memory device identifier BBE33DAB. The first flash memory device directory 602 includes a passport directory 604 and a linking table file LinkingTable.lnk 618. The passport directory 604 includes a data directory 606 and a media directory 610. The data directory 606 includes a passport data file 608. The media directory 610 includes passport picture file 612 and a first fingerprint file 614. The second flash memory directory 702 includes a passport directory 704. The passport directory 704 includes a media directory 710. The media directory 710 includes a second fingerprint file 714.

In this illustrative example, the flash memory application framework 108 detects that the first flash memory device 104 does not have sufficient storage space to store the all of the passport data and responsively partitions the fingerprint file into the first and second fingerprint files 614, 714 for storage in the two linked flash memory devices 104, 104'. The flash memory application framework 108 generates the two linking tables 800, 900 illustrated in FIGS. 8 and 9 associated with the first and second flash memory devices 104, 104', respectively.

FIG. 8 is an illustration of an example of one embodiment of a first linking table 800 linking the first flash memory device 104 to the second flash memory device 104' in accordance with the principles of the present invention. The first linking table 800 for the first flash memory device 104 defines the chain identifier as 38C826A1-E379-4e6b. The linking table 800 includes the name of the partitioned file, "fingerprint.fp", and the path, "\passport\media\fingerprint.fp" for the partitioned file in the flash memory device directory 602. The linking table 800 includes a "Linking From" field that identifies previous flash memory device in the chain. In this example, the first flash memory device 104 is the first in the chain, so the "Linking From" field is empty. The linking table 800 includes a "Linking To" field that identifies the next flash memory device 104' in the chain. In this case, the second flash memory device 104' is the next flash memory device in the chain so the flash memory device identifier for the second flash memory is provided in this field. The linking table 800 is serialized by the flash memory application framework module 108 for storage in the first flash memory device 104 as a linking table file 618.

FIG. 9 is an illustration of an example of one embodiment of a second linking table 900 linking the second flash memory device 104' back to the first flash memory device 104 in accordance with the principles of the present invention. The second linking table 900 also includes the chain identifier, the name of the partitioned file and path for the partitioned file in the second flash memory directory 702. Since the first flash memory device 104 is the previous flash memory device 104 in the chain, the first flash memory identifier is provided in the "Linking From" field of the linking table 900. Since the second flash memory device 104' is the last flash memory device 104' in the chain, the "Linking To" field is empty. The linking table 900 is serialized by the flash memory application framework module 108 for storage in the second flash memory device 104 as a linking table file 718.

Referring to FIG. 10, one embodiment of a method 1000 of managing a data file for storage in multiple contactless flash memory devices in accordance with the principles of the present invention is shown. At step 1002, a data file is generated at the host unit and the data file is divided into first and second sub data files at the host unit at step 1004. The first data file is stored at a first contactless flash memory device via a first contactless communication channel established between the host unit and the first contactless flash memory device at step 1006 and the second data file is stored at a second contactless flash memory device via a second contactless communication channel established between the host unit and the second contactless flash memory device at step 1008. It should be noted that while the steps in the method 1000 have been described in a particular order, performing one or more of the steps in a different order are also considered to be within the scope of the invention.

In another embodiment, a machine readable medium stores a machine executable program for managing a data file for storage in multiple contactless flash memory devices. The machine readable medium includes machine readable code for generating a data file at the host unit, machine readable code for dividing the data file into first and second sub data files at the host unit, machine readable code for storing the first data file at a first contactless flash memory device via a first contactless communication channel established between the host unit and the first contactless flash memory device, and machine readable code for storing the second data file at a second contactless flash memory device via a second contactless communication channel established between the host unit and the second contactless flash memory device.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of managing data stored on a contactless flash memory device, the method comprising:
   providing a compiled version of a hierarchical data model defined using a high level data structure definition language at a host unit, the host unit being operable to run on a host platform and the compiled version of the hierarchical data model being compiled for the host platform;
   establishing a contactless communication channel between the host unit and a contactless flash memory device in response to the contactless flash memory device being located in close proximity to the host unit so that data can be communicated between the host unit and the contactless flash memory device without establishing physical contact between the host unit and the contactless flash memory device;
   receiving a first representation of a first hierarchical data structure from the contactless flash memory device at the host unit via the established contactless communication channel, the first hierarchical data structure having a binary data byte sequence format; and
   generating a second representation of the first hierarchical data structure in accordance with the compiled hierarchical data model at the host unit, the second representation having a hierarchical data format.

2. The method of claim 1, further comprising:
   providing a data demarshaller at the host unit, the data demarshaller being a component of the compiled version of the hierarchical data model; and
   deserializing the first representation of the first hierarchical data structure having the binary data byte sequence format using the data demarshaller thereby generating the second representation of the first hierarchical data structure having the hierarchical data format at the host unit.

3. The method of claim 1, further comprising:
   providing a data marshaller at the host unit, the data marshaller being a component of the compiled version of the hierarchical data model;
   generating a second hierarchical data structure at the host unit having a hierarchical data format;
   serializing a first representation of the second hierarchical data structure having the hierarchical data format using the data marshaller thereby generating a second representation of the second hierarchical data structure having a binary data byte sequence format at the host unit for storage on the contactless flash memory device, and
   transmitting the second representation to the contactless flash memory device via the contactless communication channel without establishing physical contact between the host unit and the contactless flash memory device.

4. The method of claim 1, wherein providing a compiled version of the hierarchical data model defined using a high level data structure definition language at the host unit comprises providing a hierarchical data model including first and second data fields, the second data field being defined to store a digital signature of a value of the first data field.

5. The method of claim 1, wherein providing a compiled version of the hierarchical data model defined using a high level data structure definition language at the host unit comprises providing a hierarchical data model including first and second data fields defined as having first and second data types, respectively, the method further comprising:
receiving a first data directory containing a first data value of the first data type from the contactless flash memory device at the host unit via the contactless communication channel;
providing access to the first data value of the first data type at the host unit while receiving a second data directory containing a second data value of the second data type from the contactless flash memory device at the host unit via the contactless communication channel.

6. The method of claim 1, wherein providing a compiled version of the hierarchical data model defined using a high level data structure definition language at the host unit comprises providing a hierarchical data model including first and second data fields defined as having first and second data types, respectively, the method further comprising:
receiving a first data directory containing a first data value of the first data type from the contactless flash memory device at the host unit via the contactless communication channel;
receiving a second data directory containing a second data value of the second data type from the contactless flash memory device at the host unit via the contactless communication channel responsive to a request for the second data directory issued by the host unit to the contactless flash memory device.

7. The method of claim 1 further comprising:
storing a first data directory containing a first data set generated by a first flash memory application in the contactless flash memory device; and
storing a second data directory containing a second data set generated by a second flash memory application in the contactless flash memory device.

8. The method of claim 1, wherein providing a compiled version of a hierarchical data model defined using a high level data structure definition language at a host unit comprises:
receiving a hierarchical data model defined using the high level data structure definition language at the host unit; and
compiling the hierarchical data model from the high level data structure definition language for the host platform at the host unit.

9. A method of managing data stored on a contactless flash memory device, the method comprising:
providing a compiled version of a hierarchical data model defined using a high level data structure definition language at a host unit, the host unit being operable to run on a host platform and the compiled version of the hierarchical data model being compiled for the host platform, wherein the hierarchical data model includes a data field having an access control attribute;
receiving a first representation of a first hierarchical data structure from a contactless flash memory device at the host unit via a contactless communication channel, the first hierarchical data structure being a first instantiation of the hierarchical data model;
generating a second representation of the first hierarchical data structure in accordance with the compiled hierarchical data model at the host unit;
providing an access control enforcer in accordance with the defined access control attribute at the host unit, the access control enforcer being a component of the compiled version of the hierarchical data model; and
controlling access to a value of the data field within the first hierarchical data structure at the host unit using the access control enforcer.

10. A non-transitory machine readable medium storing a machine executable program for managing data stored on a contactless flash memory device comprising:
machine readable code for providing a compiled version of a hierarchical data model defined using a high level data structure definition language at a host unit, the host unit being operable to run on a host platform and the compiled version of the hierarchical data model being compiled for the host platform;
machine-readable code for establishing a contactless communication channel between the host unit and a contactless flash memory device in response to the contactless flash memory device being located in close proximity to the host unit so that data can be communicated between the host unit and the contactless flash memory device without establishing physical contact between the host unit and the contactless flash memory device;
machine readable code for receiving a first representation of a hierarchical data structure from a contactless flash memory device at the host unit via the contactless communication channel, the hierarchical data structure having a binary data byte sequence format; and
machine readable code for generating a second representation of the hierarchical data structure in accordance with the compiled hierarchical data model at the host unit, the second representation having a hierarchical data format.

11. The machine readable medium of claim 10, further comprising:
machine readable code for providing a data demarshaller at the host unit, the data demarshaller being a component of the compiled version of the hierarchical data model; and
machine readable code for deserializing the first representation of the first hierarchical data structure having the binary data byte sequence format using the data demarshaller thereby generating the second representation of the first hierarchical data structure having the hierarchical data format at the host unit.

12. The machine readable medium of claim 10, further comprising:
machine readable code for providing a data marshaller at the host unit, the data marshaller being a component of the compiled version of the hierarchical data model;
machine readable code for generating a second hierarchical data structure at the host unit; and
machine readable code for serializing a first representation of the second hierarchical data structure having a hierarchical data format using the data marshaller thereby generating a second representation of the second hierarchical data structure having a binary data byte sequence format at the host unit for storage on the contactless flash memory device.

13. The machine readable medium of claim 10, wherein the machine readable code for providing a compiled version of the hierarchical data model defined using a high level data structure definition language at the host unit comprises machine readable code for providing a hierarchical data model including first and second data fields, the second data field being defined to store a digital signature of a value of the first data field.

14. The machine readable medium of claim 10, wherein the machine readable code for providing a compiled version of the hierarchical data model defined using a high level data structure definition language at the host unit comprises machine readable code for providing a hierarchical data model including first and second data fields defined as having first and second data types, respectively, the machine readable code further comprising:

machine readable code for receiving a first data directory containing a first data value of the first data type from the contactless flash memory device at the host unit via the contactless communication channel; and machine readable code for providing access to the first data value of the first data type at the host unit while receiving a second data directory containing a second data value of the second data type from the contactless flash memory device at the host unit via the contactless communication channel.

15. The machine readable medium of claim 10, wherein the machine readable code for providing a compiled version of the hierarchical data model defined using a high level data structure definition language at the host unit comprises machine readable code for providing a hierarchical data model including first and second data fields defined as having first and second data types, respectively, the machine readable medium further comprising:

machine readable code for receiving a first data directory containing a first data value of the first data type from the contactless flash memory device at the host unit via the contactless communication channel;

machine readable code for receiving a second data directory containing a second data value of the second data type from the contactless flash memory device at the host unit via the contactless communication channel responsive to a request for the second data directory issued by the host unit to the contactless flash memory device.

16. The machine readable medium of claim 10, further comprising:

machine readable code for storing a first data directory containing a first data set generated by a first flash memory application in the contactless flash memory device; and machine readable code for storing a second data directory containing a second data set generated by a second flash memory application in the contactless flash memory device.

17. The machine readable medium of claim 10, wherein the machine readable code for providing a compiled version of a hierarchical data model defined using a high level data structure definition language at a host unit comprises:

machine readable code for receiving a hierarchical data model defined using the high level data structure definition language at the host unit; and machine readable code for compiling the hierarchical data model from the high level data structure definition language for the host platform at the host unit.

18. A non-transitory machine readable medium storing a machine executable program for managing data stored on a contactless flash memory device comprising:

machine readable code for providing a compiled version of a hierarchical data model defined using a high level data structure definition language at a host unit, the host unit being operable to run on a host platform and the compiled version of the hierarchical data model being compiled for the host platform, wherein the hierarchical data model includes a data field having an access control attribute;

machine readable code for receiving a first representation of a hierarchical data structure from a contactless flash memory device at the host unit via a contactless communication channel, the hierarchical data structure being a first instantiation of the hierarchical data model; and machine readable code for generating a second representation of the hierarchical data structure in accordance with the compiled hierarchical data model at the host unit;

machine readable code for providing an access control enforcer in accordance with the defined access control attribute at the host unit, the access control enforcer being a component of the compiled version of the hierarchical data model; and machine readable code for controlling access to a value of the data field within the first hierarchical data structure at the host unit using the access control enforcer.

19. A method of managing a data file for storage in multiple contactless flash memory devices, the method comprising:

generating a data file at the host unit, wherein contents of the data file include first data and the second data, wherein the first data is different than the second data;

dividing the contents of the data file between first and second sub data files at the host unit, wherein the first sub data file includes the first data and the second sub data file includes second data;

storing the first sub data file at a first contactless flash memory device via a first contactless communication channel established between the host unit and the first contactless flash memory device when the first contactless flash memory device is located in close proximity to the host unit and without establishing physical contact between the host unit and the first contactless flash memory device;

storing the second sub data file at a second contactless flash memory device via a second contactless communication channel established between the host unit and the second contactless flash memory device when the second contactless flash memor device is located in close proximity to the host unit and without establishing physical contact between the host unit and the second contactless flash memory device, wherein the contents of the data file are divided between the first contactless flash memory device and the second contactless flash memory device.

20. The method of claim 19, further comprising:

creating a first link table file associated with the data file defining a first link to the second contactless flash memory device at the host unit;

storing the first link table file at the first contactless flash memory device via the first contactless communication channel;

creating a second link table file associated with the data file defining a link from the first contactless flash memory device at the host unit; and storing the second link table file at the second contactless flash memory device via the second contactless communication channel.

21. The method of claim 20, further comprising:

downloading a first data content of the second contactless flash memory device at the host unit via the second contactless communication channel, the first data content including the second sub data file and the second link table file;

identifying the second link from the first contactless flash memory defined in the second link table file; and downloading a second data content of the first contactless flash memory device at the host unit via the first contactless communication channel based on the identification of the second link, the second data content including the first sub data file.

22. A method of managing a data file for storage in multiple contactless flash memory devices, the method comprising:

generating a data file at the host unit;

dividing the data file into first and second sub data files at the host unit;

storing the first sub data file at a first contactless flash memory device via a first contactless communication channel established between the host unit and the first contactless flash memory device;

storing the second sub data file at a second contactless flash memory device via a second contactless communication channel established between the host unit and the second contactless flash memory device;

creating a first link table file associated with the data file defining a first link to the second contactless flash memory device at the host unit;

storing the first link table file at the first contactless flash memory device via the first contactless communication channel;

creating a second link table file associated with the data file defining a link from the first contactless flash memory device at the host unit;

storing the second link table file at the second contactless flash memory device via the second contactless communication channel;

downloading a first data content of the first contactless flash memory device at the host unit via the first contactless communication channel, the first data content including the first sub data file and the first link table file;

identifying the first link to the second contactless flash memory defined in the first link table file; and downloading a second data content of the second contactless flash memory device at the host unit via the second contactless communication channel based on the identification of the first link, the second data content including the second sub data file.

23. A non-transitory machine readable medium storing a machine executable program for managing a data file for storage in multiple contactless flash memory devices, comprising:

machine readable code for generating a data file at the host unit, wherein contents of the data file include first data and second data, the first data being different than the second data;

machine readable code for dividing the contents of the data file between first and second sub data files at the host unit, wherein the first sub data file includes the first data and the second sub data file includes the second data;

machine readable code for storing the first sub data file at a first contactless flash memory device via a first contactless communication channel established between the host unit and the first contactless flash memory device when the first contactless flash memory device is located in close proximity to the host unit and without establishing physical contact between the host unit and the first contactless flash memory device;

machine readable code for storing the second sub data file at a second contactless flash memory device via a second contactless communication channel established between the host unit and the second contactless flash memory device when the second contactless flash memory device is located in close proximity to the host unit and without establishing physical contact between the host unit and the second contactless flash memory device, wherein the contents of the data file are divided between the first contactless flash memory device and the second contactless flash memory device.

24. The machine readable medium of claim 23, further comprising:

machine readable code for creating a first link table file associated with the data file defining a first link to the second contactless flash memory device at the host unit;

machine readable code for storing the first link table file at the first contactless flash memory device via the first contactless communication channel;

machine readable code for creating a second link table file associated with the data file defining a link from the first contactless flash memory device at the host unit; and machine readable code for storing the second link table file at the second contactless flash memory device via the second contactless communication channel.

25. The machine readable medium of claim 24, further comprising:

machine readable code for downloading a first data content of the second contactless flash memory device at the host unit via the second contactless communication channel, the first data content including the second sub data file and the second link table file;

machine readable code for identifying the second link from the first contactless flash memory defined in the second link table file; and machine readable code for downloading a second data content of the first contactless flash memory device at the host unit via the first contactless communication channel based on the identification of the second link, the second data content including the first sub data file.

26. A non-transitory machine readable medium storing a machine executable program for managing a data file for storage in multiple contactless flash memory devices, comprising:

machine readable code for generating a data file at the host unit;

machine readable code for dividing the data file into first and second sub data files at the host unit;

machine readable code for storing the first sub data file at a first contactless flash memory device via a first contactless communication channel established between the host unit and the first contactless flash memory device;

machine readable code for storing the second sub data file at a second contactless flash memory device via a second contactless communication channel established between the host unit and the second contactless flash memory device;

machine readable code for creating a first link table file associated with the data file defining a first link to the second contactless flash memory device at the host unit;

machine readable code for storing the first link table file at the first contactless flash memory device via the first contactless communication channel;

machine readable code for creating a second link table file associated with the data file defining a link from the first contactless flash memory device at the host unit;

machine readable code for storing the second link table file at the second contactless flash memory device via the second contactless communication channel;

machine readable code for downloading a first data content of the first contactless flash memory device at the host unit via the first contactless communication channel, the first data content including the first sub data file and the first link table file;

machine readable code for identifying the first link to the second contactless flash memory defined in the first link table file; and machine readable code for downloading a second data content of the second contactless flash memory device at the host unit via the second contactless communication channel based on the identification of the first link, the second data content including the second sub data file.

* * * * *